(12) United States Patent
Patel et al.

(10) Patent No.: US 8,130,726 B2
(45) Date of Patent: Mar. 6, 2012

(54) COARSE BIN FREQUENCY SYNCHRONIZATION IN A COMMUNICATION SYSTEM

(75) Inventors: Shimman Patel, San Diego, CA (US);
Kuei-Chiang Lai, Hsinchu (TW);
Seguei A. Glazko, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 828 days.

(21) Appl. No.: 11/313,555

(22) Filed: Dec. 20, 2005

(65) Prior Publication Data
US 2007/0140323 A1 Jun. 21, 2007

(51) Int. Cl.
*H04B 7/216* (2006.01)
(52) U.S. Cl. ....... 370/335; 370/324; 370/350; 455/63.1; 455/67.13; 455/101; 455/418; 455/501; 455/504; 455/505; 455/506
(58) Field of Classification Search ................. 370/324, 370/335, 350; 455/418, 504–506, 501, 63.1, 455/67.13, 101
See application file for complete search history.

(56) References Cited

U.S. PATENT DOCUMENTS

| | | | | |
|---|---|---|---|---|
| 5,889,759 | A * | 3/1999 | McGibney | 370/207 |
| 6,459,744 | B1 * | 10/2002 | Helard et al. | 375/354 |
| 6,831,940 | B2 | 12/2004 | Harms et al. | |
| 7,050,511 | B2 * | 5/2006 | Jeong et al. | 375/301 |
| 7,068,593 | B2 * | 6/2006 | Cho et al. | 370/208 |
| 7,072,783 | B2 * | 7/2006 | Makhlouf et al. | 702/69 |
| 7,088,782 | B2 * | 8/2006 | Mody et al. | 375/260 |
| 2004/0116078 | A1 * | 6/2004 | Rooyen et al. | 455/101 |
| 2004/0156309 | A1 * | 8/2004 | Chadha et al. | 370/208 |
| 2005/0053172 | A1 * | 3/2005 | Heikkila | 375/333 |
| 2005/0058224 | A1 | 3/2005 | Alagha et al. | |
| 2005/0063298 | A1 | 3/2005 | Ling et al. | |
| 2005/0069066 | A1 | 3/2005 | Meyer et al. | |

(Continued)

FOREIGN PATENT DOCUMENTS

CN 1312979 9/2001

(Continued)

OTHER PUBLICATIONS

International Preliminary Report on Patentability—PCT/US2006/062125, International Search Authority—The International Bureau of WIPO—Geneva, WIPO—Jun. 24, 2008.

(Continued)

*Primary Examiner* — Steve D Agosta
(74) *Attorney, Agent, or Firm* — Timothy F. Loomis; Sayed H. Beladi (57) ABSTRACT

For frequency bin error estimation, multiple hypotheses are formed for different frequency bin errors, pilot offsets, or combinations of frequency bin error and pilot offset. For each hypothesis, received symbols are extracted from the proper subbands determined by the hypothesis. In one scheme, the extracted received symbols for each hypothesis are despread with a scrambling sequence to obtain despread symbols for that hypothesis. A metric is derived for each hypothesis based on the despread symbols, e.g., by deriving a channel impulse response estimate based on the despread symbols and then deriving the metric based on the channel impulse response estimate. In another scheme, the extracted received symbols for each hypothesis are correlated, and a metric is derived based on the correlation results. For both schemes, the frequency bin error and/or the pilot offset are determined based on the metrics for all hypotheses evaluated.

21 Claims, 7 Drawing Sheets

U.S. PATENT DOCUMENTS

| | | | | |
|---|---|---|---|---|
| 2005/0259723 | A1* | 11/2005 | Blanchard | 375/146 |
| 2006/0061691 | A1* | 3/2006 | Rabinowitz et al. | 348/625 |
| 2007/0058735 | A1* | 3/2007 | Ghosh | 375/260 |
| 2007/0110174 | A1* | 5/2007 | Glazko et al. | 375/260 |

FOREIGN PATENT DOCUMENTS

| | | | |
|---|---|---|---|
| EP | 1480401 | A2 | 2/2004 |
| JP | 2002518930 | T | 6/2002 |
| JP | 2003124905 | A | 4/2003 |
| WO | 9836580 | | 8/1998 |
| WO | 0030312 | | 5/2000 |
| WO | WO-00/30312 | * | 5/2000 |
| WO | 2005057943 | | 6/2005 |
| WO | WO2005071911 | | 8/2005 |
| WO | WO2005086729 | A2 | 9/2005 |

OTHER PUBLICATIONS

Written Opinion—PCT/US2006/062125, International Search Authority—European Patent Office—May 29, 2008.

International Search Report—PCT/US2006/062125, International Search Authority—European Patent Office—May 29, 2008.

European Search Report—EP10006180—Search Authority—Munich—Jun. 20, 2011.

Minn H et al., "A combined timing and frequency synchronization and channel estimation for OFDM", 2004 IEEE International Conference on Communications ; ICC 2004 ; Jun. 20-24, 2004, Paris, IEEE Operations Center, Piscataway, NJ, USA, vol . 2, Jun. 20, 2004, pp. 872-876, XP010710439, ISBN: 978-0-7803-8533-7.

* cited by examiner

FIG. 3A — DVB-H

FIG. 3B — ISDB-T

COARSE BIN FREQUENCY SYNCHRONIZATION IN A COMMUNICATION SYSTEM

BACKGROUND

I. Field

The present disclosure relates generally to communication, and more specifically to techniques for performing frequency synchronization in a communication system.

II. Background

Orthogonal frequency division multiplexing (OFDM) is a multi-carrier modulation technique that can provide good performance for some wireless environments. OFDM partitions the overall system bandwidth into multiple (K) orthogonal frequency subbands, which are also called carriers, subcarriers, tones, and so on. With OFDM, each subband is associated with a respective carrier that may be modulated with data. In the following description, "subband" and "carrier" are synonymous terms and are used interchangeably.

In an OFDM system, a transmitter processes (e.g., encodes, interleaves, and modulates) traffic data to generate modulation symbols and further maps the modulation symbols to the K total subbands. The transmitter then transforms the modulation symbols for each OFDM symbol period to the time domain and forms an OFDM symbol. The transmitter transmits the OFDM symbols to a receiver.

The receiver performs the complementary processing on the OFDM symbols received from the transmitter. The receiver transforms each received OFDM symbol to the frequency domain to obtain K received symbols for the K subbands. The received symbols are noisy and distorted versions of the modulation symbols sent by the transmitter. The receiver typically performs frequency synchronization to determine frequency error at the receiver. The frequency error may be due to difference in the oscillator frequencies at the transmitter and the receiver, Doppler shift, and so on. Frequency synchronization is challenging in certain channel environments such as low signal-to-noise ratio (SNR) conditions, fast fading, and so on. Furthermore, it is desirable to perform frequency synchronization quickly so that the processing overhead is as low as possible.

There is therefore a need in the art for techniques to perform frequency synchronization in a communication system.

SUMMARY

Techniques for performing frequency synchronization in a communication system are described herein. The frequency error at a receiver may be decomposed into a fractional portion and an integer portion. The fractional portion is less than one bin and may be estimated and removed in a manner known in the art. A bin is the spacing between adjacent subbands. The integer portion is also called frequency bin error and is an integer number of bins. The frequency bin error may be estimated using the techniques described herein.

In an embodiment of frequency bin error estimation, multiple hypotheses are initially formed for different frequency bin errors, different pilot offsets, or different combinations of frequency bin error and pilot offset. A pilot may be sent on different sets of subbands, and each pilot offset corresponds to a different set of subbands on which the pilot may have been sent. For each hypothesis, received symbols are extracted from the proper subbands determined by the hypothesis. The extracted received symbols are hypothesized to be for (1) a scattered pilot that is sent on different sets of subbands in different symbol periods and/or (2) a continual pilot that is sent on a fixed set of subbands in all symbol periods.

In an embodiment, the extracted received symbols for each hypothesis are despread with a scrambling sequence to obtain despread symbols for that hypothesis. The scrambling sequence is used to generate the scattered and continual pilots at the transmitter. A metric is then derived for each hypothesis based on the despread symbols for that hypothesis, e.g., by deriving a channel impulse response estimate based on the despread symbols and then deriving the metric based on the channel impulse response estimate. In another embodiment, the extracted received symbols for each hypothesis are correlated, and a metric is derived for the hypothesis based on the correlation results. For both embodiments, the frequency bin error and/or the pilot offset are determined based on the metrics for all hypotheses evaluated.

The frequency bin error estimation may also be performed in other manners, as described below. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The frequency synchronization techniques described herein may be used for various communication systems such as an OFDM system, an orthogonal frequency division multiple access (OFDMA) system, a single-carrier frequency division multiple access (SC-FDMA) system, and so on. An OFDMA system utilizes OFDM. An SC-FDMA system may utilize interleaved FDMA (IFDMA) to transmit on subbands that are distributed across the system bandwidth, localized FDMA (LFDMA) to transmit on a block of adjacent subbands, or enhanced FDMA (EFDMA) to transmit on multiple blocks of adjacent subbands. In general, modulation symbols are sent in the frequency domain with OFDM and in the time domain with SC-FDMA.

For clarity, the techniques are specifically described below for two exemplary OFDM-based systems that implement Digital Video Broadcasting for Handhelds (DVB-H) and Integrated Services Digital Broadcasting for Terrestrial Television Broadcasting (ISDB-T). DVB-H and ISDB-T support digital transmission of multimedia over a terrestrial communication network. DVB-H has 3 modes of operation for FFT sizes of 2K, 4K and 8K. ISDB-T has 3 modes of operation for FFT sizes of 256, 512 and 1K. DVB-H is described in document ETSI EN 300 744, entitled "Digital Video Broadcasting (DVB); Framing structure, channel coding and modulation for digital terrestrial television," November 2004. ISDB-T is described in document ARIB STD-B31, entitled "Transmission System for Digital Terrestrial Television Broadcasting," July 2003. These documents are publicly available.

Figure 1:
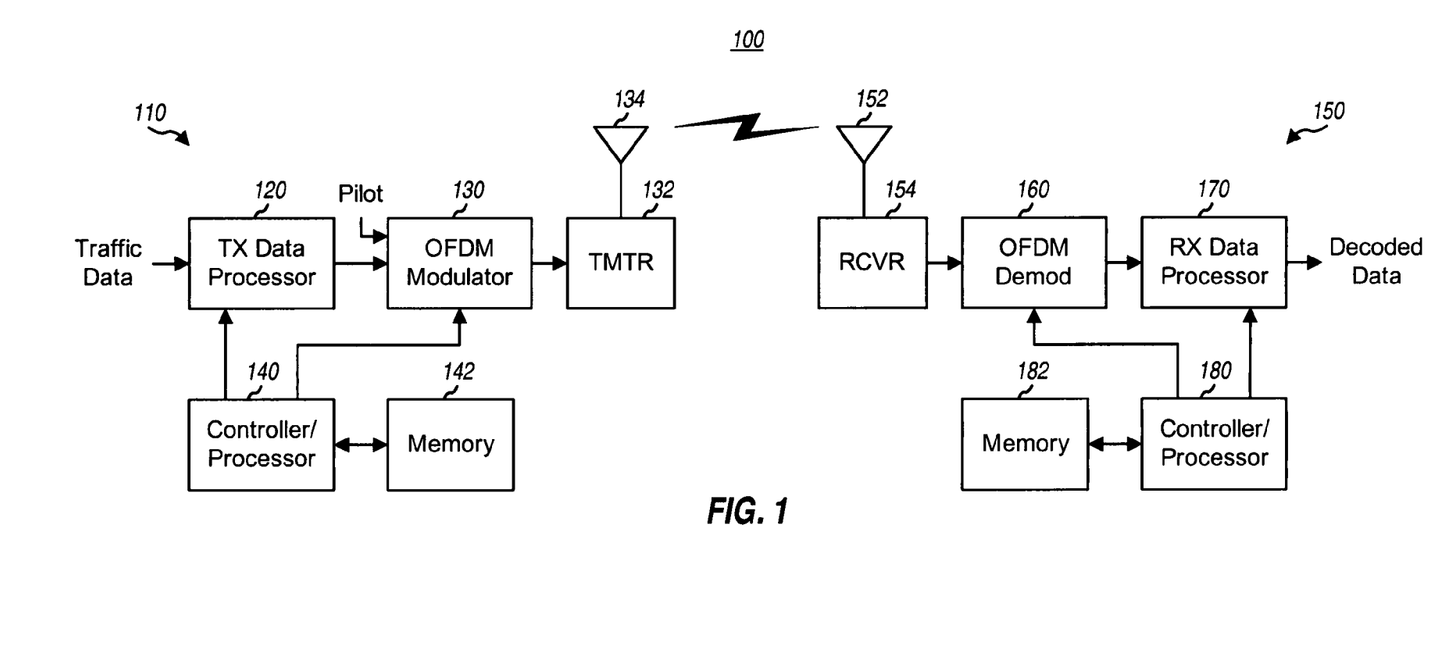
FIG. 1 shows a block diagram of a transmitter and a receiver.

FIG. 1 shows a block diagram of a transmitter 110 and a receiver 150 in an OFDM-based system 100, which may implement DVB-H, ISDB-T, and/or some other design. At transmitter 110, a transmit (TX) data processor 120 receives and processes (e.g., formats, encodes, interleaves, and symbol maps) traffic data to generate data symbols. As used herein, a data symbol is a modulation symbol for traffic data, a pilot symbol is a modulation symbol for pilot, which is data that is known a priori by both the transmitter and receiver, and a zero symbol is a signal value of zero.

An OFDM modulator 130 receives and multiplexes the data symbols and pilot symbols onto data subbands and pilot subbands, respectively. A data subband is a subband used to send traffic data, and a pilot subband is a subband used to send pilot. A given subband may serve as a data subband in one OFDM symbol period and as a pilot subband in another OFDM symbol period. An OFDM symbol period is the duration of one OFDM symbol and is also referred to as a symbol period. The pilot symbols may be multiplexed with the data symbols as described below. OFDM modulator 130 obtains K transmit symbols for the K total subbands in each OFDM symbol period. Each transmit symbol may be a data symbol, a pilot symbol, or a zero symbol. OFDM modulator 130 transforms the K transmit symbols for each OFDM symbol period with a K-point inverse fast Fourier transform (IFFT) or inverse discrete Fourier transform (IDFT) to obtain a transformed symbol that contains K time-domain chips. OFDM modulator 130 then repeats a portion of the transformed symbol to generate an OFDM symbol. The repeated portion is often called a cyclic prefix or a guard interval and is used to combat frequency selective fading, which is a frequency response that varies across the system bandwidth due to multipath in a wireless channel. OFDM modulator 130 provides an OFDM symbol for each OFDM symbol period. A transmitter unit (TMTR) 132 receives and processes (e.g., converts to analog, amplifies, filters, and frequency upconverts) the OFDM symbols and generates a modulated signal, which is transmitted via an antenna 134 to receiver 150.

At receiver 150, an antenna 152 receives the modulated signal from transmitter 110 and provides a received signal to a receiver unit (RCVR) 154. Receiver unit 154 conditions (e.g., filters, amplifies, frequency downconverts, and digitizes) the received signal to obtain input samples. An OFDM demodulator (Demod) 160 processes the input samples as described below and obtains K received symbols for the K total subbands in each OFDM symbol period. The received symbols include received data symbols for the data subbands and received pilot symbols for the pilot subbands. OFDM demodulator 160 performs frequency synchronization to estimate and remove the frequency error at receiver 150. OFDM demodulator 160 also performs data demodulation/detection on the received data symbols with a channel estimate to obtain data symbol estimates, which are estimates of the data symbols sent by transmitter 110. A receive (RX) data processor 170 then processes (e.g., symbol demaps, deinterleaves, and decodes) the data symbol estimates to obtain decoded data. In general, the processing by OFDM demodulator 160 and RX data processor 170 is complementary to the processing by OFDM modulator 130 and TX data processor 120, respectively, at transmitter 110.

Controllers/processors 140 and 180 control the operation of various processing units at transmitter 110 and receiver 150, respectively. Memories 142 and 182 store data and program codes for transmitter 110 and receiver 150, respectively.

Figure 2:
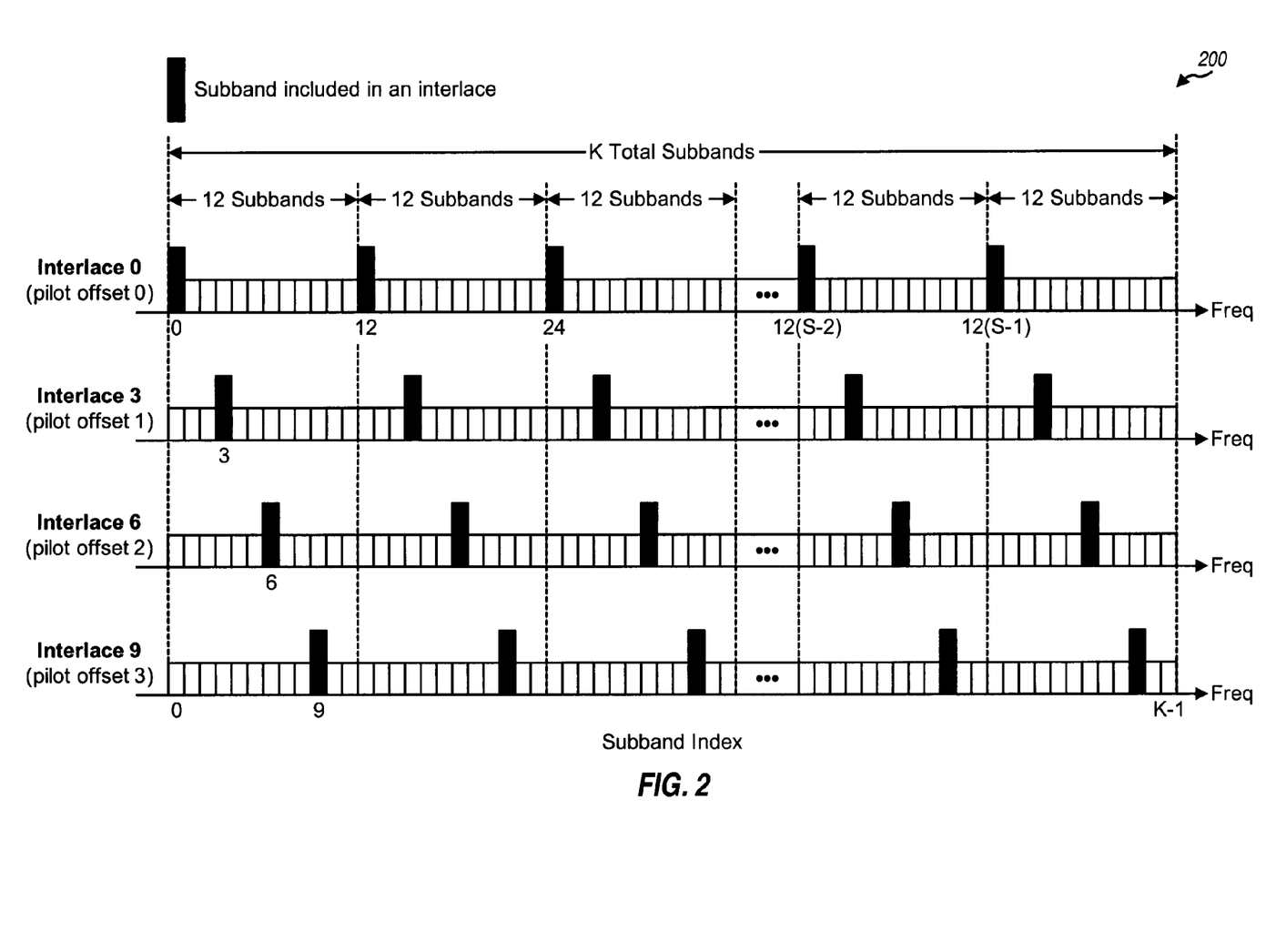
FIG. 2 shows a subband structure.

FIG. 2 shows an exemplary subband structure 200 for system 100. The overall system bandwidth of BW MHz is partitioned into multiple (K) subbands that are given indices of 0 through K−1, where K may be a configurable value. The spacing between adjacent subbands is BW/K MHz. For subband structure 200, the K total subbands are arranged into 12 disjoint interlaces. The 12 interlaces are disjoint in that each of the K subbands belongs in only one interlace. Each interlace contains approximately K/12 subbands that are uniformly distributed across the K total subbands such that consecutive subbands in the interlace are spaced apart by 12 subbands. Thus, interlace u, for u ∈ {0, . . . , 11}, contains subbands u, u+12, u+24, . . . . Index u is the interlace index as well as a subband offset that indicates the first subband in the interlace. FIG. 2 only shows four interlaces 0, 3, 6 and 9.

Figure 3A:
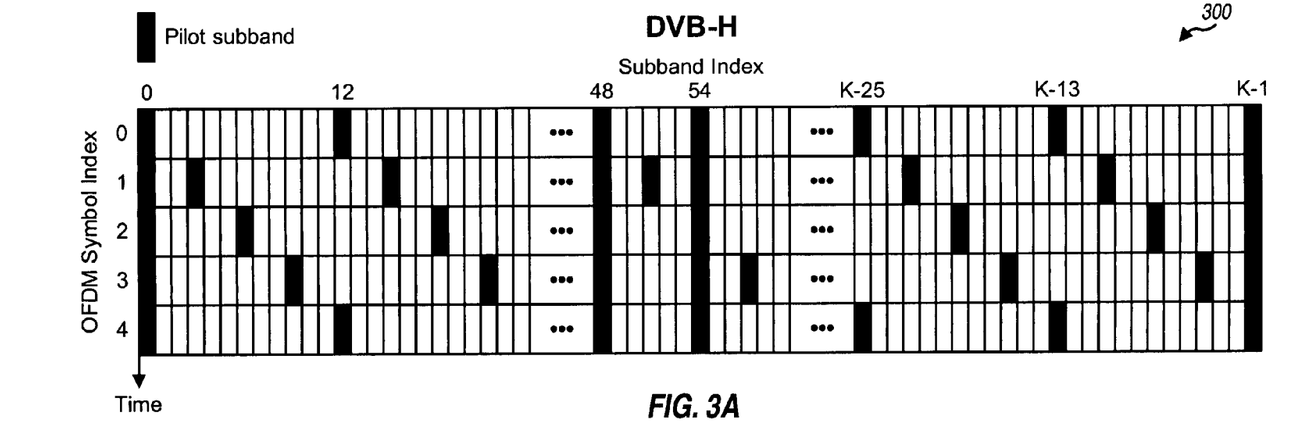
FIGS. 3A and 3B show pilot structures for DVB-H and ISDB-T, respectively.

FIG. 3A shows a pilot structure 300 for DVB-H. Pilot structure 300 includes a continual pilot and a scattered pilot. The continual pilot is sent on C subbands that are distributed across the system bandwidth, where C is dependent on the mode. The pilot is continual in that it is sent on the same C subbands in all OFDM symbol periods. These C subbands include subbands 0, 48, 54, . . . , K−1 and are given in ETSI EN 300 744. The scattered pilot is sent on one interlace in each OFDM symbol period. The transmission timeline for DVB-H is partitioned into frames, with each frame including 68 OFDM symbols that are given indices of 0 through 67. The scattered pilot is sent on interlace 0 in OFDM symbol 0, interlace 3 in OFDM symbol 1, interlace 6 in OFDM symbol 2, interlace 9 in OFDM symbol 4, interlace 0 in OFDM symbol 5, and so on. The scattered pilot is thus sent on the same four interlaces in each set of 4 OFDM symbols.

Figure 3B:
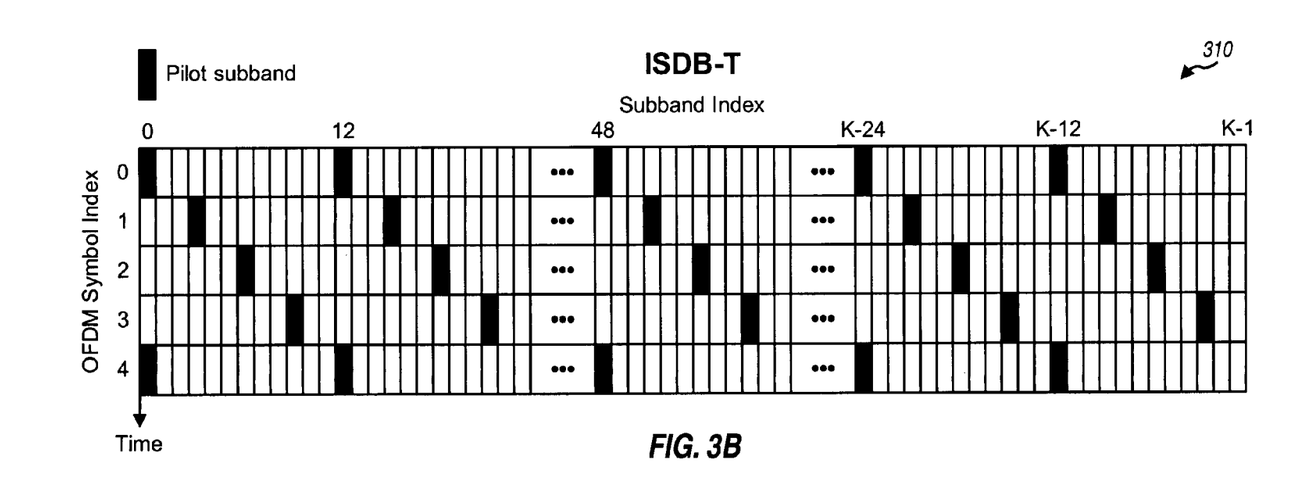

FIG. 3B shows a pilot structure 310 for ISDB-T. Pilot structure 310 includes only a scattered pilot that is sent on interlaces 0, 3, 6 and 9 in each set of 4 OFDM symbols. The transmission timeline for ISDB-T is also partitioned into frames, with each frame including 204 OFDM symbols that are given indices of 0 through 203. The scattered pilot is sent on interlace 0 in OFDM symbol 0 and cycles through interlaces 0, 3, 6 and 9 in the same manner as the scattered pilot for DVB-H.

For both DVB-H and ISDB-T, the pilot symbols for each OFDM symbol are generated based on a pseudo-random binary sequence (PBRS) that is derived from a specific generator polynomial. The PBRS sequence contains K bits and is given as:

$$\{w\} = \{w_0, w_1, w_2, w_3, w_4, \ldots, w_{K-1}\}. \qquad \text{Eq (1)}$$

PBRS bit $w_k$, for $k \in \{0, \ldots, K-1\}$, is used to generate a BPSK modulation symbol that is used as a pilot symbol for subband k. The pilot symbols for interlace u, for $u \in \{0, 3, 6, 9\}$, are generated with PBRS bits $\{w_u, w_{u+12}, w_{u+24}, w_{u+36}, \ldots\}$.

Table 1 lists the values for some parameters for the three modes in DVB-H and ISDB-T. In Table 1, parameters N, K, C and S are given for one OFDM symbol. The number of scattered pilot subbands (S) for both DVB-H and ISDB-T and the number of continual pilot subbands (C) for DVB-H are dependent on the mode. For ISDB-T, K is an integer multiple of 12, and interlaces 0, 3, 6 and 9 contain the same number of pilot subbands. For DVB-H, K is not an integer multiple of 12, and interlace 0 contains one more pilot subband than interlaces 3, 6 and 9. For simplicity, the following description assumes that the interlaces contain the same number of (S) pilot subbands.

TABLE 1

| Description | | DVB-H | | | ISDB-T | | |
|---|---|---|---|---|---|---|---|
| Mode | Notation | 1 | 2 | 3 | 1 | 2 | 3 |
| FFT size | N | 2048 | 4096 | 8192 | 256 | 512 | 1024 |
| Total number of subbands | K | 1705 | 3409 | 6817 | 108 | 216 | 432 |
| Number of continual pilot subbands | C | 45 | 89 | 177 | — | — | — |
| Number of scattered pilot subbands | S | 142 | 284 | 568 | 9 | 18 | 36 |

In Table 1, the FFT size is more than twice the total number of subbands for ISDB-T in order to relax the front-end filtering requirements while still maintain a low level of aliasing noise.

Figure 4:
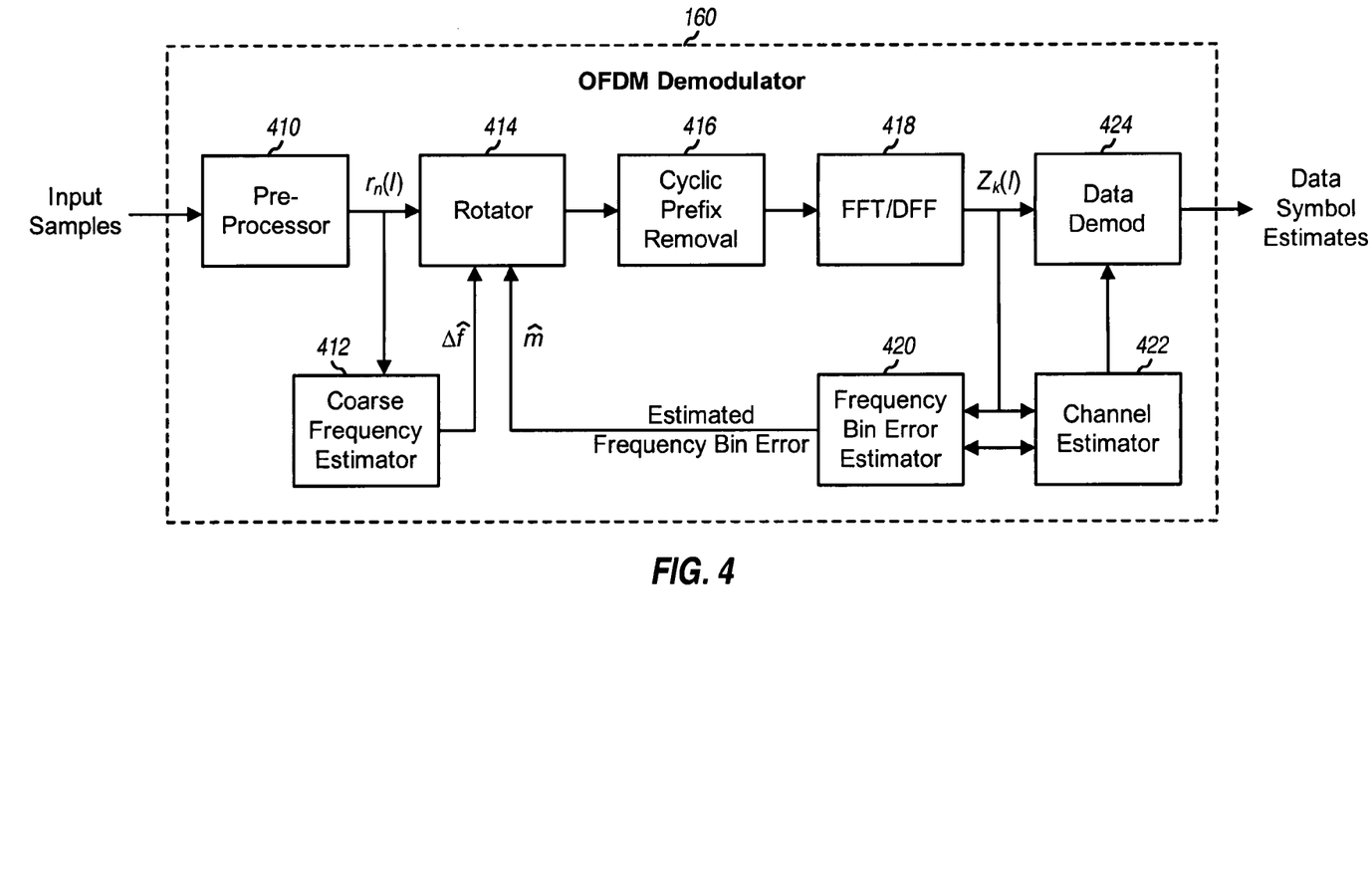
FIG. 4 shows an OFDM demodulator at the receiver.

FIG. 4 shows a block diagram of an embodiment of OFDM demodulator 160 at receiver 150 in FIG. 1. Within OFDM demodulator 160, a pre-processor 410 receives and processes the input samples from receiver unit 154 and provides pre-processed samples. Pre-processor 410 may perform automatic gain control (AGC), timing acquisition, filtering, sample rate conversion, direct current (DC) offset removal, and/or other functions. The pre-processed samples have a frequency error that may be expressed as:

$$f_{err} = m \cdot f_{bin} + \Delta f,$$ Eq (2)

where $f_{err}$ is the total frequency error at the receiver;

$\Delta f$ is the fractional portion of the frequency error, which is less than one bin;

$f_{bin}$ is one bin, which is the spacing between adjacent subbands; and m is the integer portion of the frequency error, which is an integer number of bins.

The integer portion of the frequency error is also called frequency bin error or coarse bin frequency error.

A coarse frequency estimator 412 estimates the fractional frequency error $\Delta f$ based on the pre-processed samples and in a manner known in the art. A rotator 414 receives the estimated fractional frequency error $\Delta \hat{f}$ from estimator 412 and the estimated frequency bin error $\hat{m}$ from a frequency bin error estimator 420, removes the estimated total frequency error from the pre-processed samples, and provides frequency-corrected samples. A cyclic prefix removal unit 416 removes the cyclic prefix appended to each OFDM symbol and provides received samples.

An FFT/DFT unit 418 performs a fast Fourier transform (FFT) or discrete Fourier transform (DFT) on the received samples for each OFDM symbol period and provides frequency-domain received symbols for the K total subbands. Frequency bin error estimator 420 estimates the frequency bin error based on the received pilot symbols and provides the estimated frequency bin error, as described below. Rotator 414 may remove the estimated frequency bin error from the pre-processed samples, as shown in FIG. 4. Alternatively, a frequency bin correction unit can remove the estimated frequency bin error from the received data symbols (not shown in FIG. 4). A channel estimator 422 derives a channel estimate based on the received pilot symbols. The channel estimate may be a time-domain channel impulse response estimate or a frequency-domain channel frequency response estimate. A data demodulator 424 performs data demodulation/detection on the received data symbols with the channel estimate and provides data symbol estimates.

Although not shown in FIG. 4 for simplicity, OFDM demodulator 160 may include processing units for fine frequency tracking, fine time tracking, frame synchronization, and/or other functions.

Frequency bin error estimator 420 estimates the frequency bin error and further determines the scattered pilot offset, which indicates the specific interlace used for the scattered pilot in each OFDM symbol period. The maximum frequency bin error is determined by the accuracy of the reference oscillator at receiver 150, the center frequency of the modulated signal being received, and the mode used by the system. For example, if the reference oscillator has a maximum error of 5 parts per million (ppm) and the center frequency is 800 MHz, then the maximum frequency error is ±4 KHz. This ±4 KHz frequency error corresponds to ±4 bins for a subband spacing of 1116 Hz for mode 3 in ISDB-T and to ±6 bins for a subband spacing of 697 Hz for mode 3 in DVB-H. For ISDB-T, there is an ambiguity of ±4 bins. Hence, the correct frequency bin error is one of 9 "frequency" hypotheses for −4, −3, −2, −1, 0, +1, +2, +3 and +4 bin errors.

Receiver 150 typically does not have frame timing when first tuned to transmitter 110. In this case, for a given OFDM symbol, receiver 150 does not know whether the scattered pilot is being sent on interlace 0, 3, 6 or 9. As shown in FIG. 2, a pilot offset of 0 corresponds to the scattered pilot being sent on interlace 0, a pilot offset of 1 corresponds to the scattered pilot being sent on interlace 3, a pilot offset of 2 corresponds to the scattered pilot being sent on interlace 6, and a pilot offset of 3 corresponds to the scattered pilot being sent on interlace 9. There is thus an ambiguity of 4 pilot offsets. Hence, the correct pilot offset is one of 4 "time" hypotheses for pilot offsets of 0, 1, 2 and 3.

The frequency bin error estimation may be performed in various manners. In an embodiment, the estimation is performed based on an assumption that both frequency bin error and pilot offset are unknown. For this embodiment, multiple hypotheses are formed jointly for frequency and time. In another embodiment, the estimation is performed in two steps, with the first step determining the frequency bin error and the second step determining the pilot offset. For this embodiment, multiple hypotheses are formed separately for frequency and time. The frequency bin error estimation may also be performed based on various metrics. In an embodiment, the estimation is performed based on metrics derived from despreading the received symbols. In another embodiment, the estimation is performed based on metrics derived from correlating the received symbols.

Table 2 lists four exemplary frequency bin error estimation schemes, the hypotheses and metrics for each scheme, and the system(s) for which each scheme is applicable. For clarity, schemes 1 and 4 are specifically described below.

TABLE 2

| Scheme | Hypotheses | Metrics | System(s) |
|---|---|---|---|
| 1 | Joint frequency and time | Despreading-based | DVB-H and ISDB-T |
| 2 | Joint frequency and time | Correlation-based | DVB-H and ISDB-T |
| 3 | Separate frequency and time | Despreading-based | DVB-H |

TABLE 2-continued

| Scheme | Hypotheses | Metrics | System(s) |
| --- | --- | --- | --- |
| 4 | Separate frequency and time | Correlation-based | DVB-H |

For frequency bin error estimation scheme 1 in Table 2, multiple frequency/time hypotheses are formed for different combinations of frequency bin error and pilot offset. The total number of frequency/time hypotheses to evaluate is equal to the product of the number of hypotheses for frequency bin error (for frequency uncertainty) and the number of hypotheses for pilot offset (for time uncertainty), which is 9×4=36 frequency/time hypotheses for the example described above for ISDB-T. One frequency/time hypothesis is the correct hypothesis for both frequency bin error and pilot offset, and the remaining frequency/time hypotheses are incorrect.

The received symbols at receiver 150, without any frequency error, may be expressed as:

$$Z_k(l) = H_k(l) \cdot S_k(l) + N_k(l), \quad \text{Eq (3)}$$

where $S_k(l)$ is a modulation symbol sent on subband k in OFDM symbol period l;

$H_k(l)$ is a channel gain for subband k in OFDM symbol period l;

$Z_k(l)$ is a received symbol for subband k in OFDM symbol period l; and $N_k(l)$ is the noise for subband k in OFDM symbol period l.

$S_k(l)$ may be a data symbol or a pilot symbol. The pilot symbols are generated based on the PBRS sequence, and the pilot symbol for subband k may be given as $S_k(l) = (4/3) \cdot w_k$, where 4/3 is a scaling factor for pilot relative to data.

If the frequency error is x bins, and assuming that the fraction frequency error Δf has been removed by rotator 414, then the received symbols for OFDM symbol periods l and l+1 may be expressed as:

$$Z_{k+x}(l) = H_k(l) \cdot S_k(l) + N_{k+x}(l), \text{ and} \quad \text{Eq (4)}$$

$$Z_{k+x}(l+1) = e^{j2\pi \cdot x \cdot G} \cdot H_k(l+1) \cdot S_k(l+1) + N_{k+x}(l+1), \quad \text{Eq (5)}$$

where G is a guard interval ratio. As shown in equations (4) and (5), a frequency error of x bins results in the modulation symbol sent on subband k being received on subband k+x at the receiver. The factor $e^{j2\pi \cdot x \cdot G}$ is due to phase rotation in the received symbols for OFDM symbol l+1 relative to the phase of the received symbols for OFDM symbol l with a frequency error of x bins.

In an embodiment, each frequency/time hypothesis covers a set of four consecutive OFDM symbols l through l+3. A given frequency/time hypothesis $H_{x,y}$, which corresponds to a hypothesized frequency error of x bins and a hypothesized pilot offset of y, may be evaluated as follows. First, the received symbols are extracted from pilot subbands corresponding to frequency bin error x and pilot offset y. In particular, received symbols are extracted from interlaces x, x+3, x+6 and x+9 in the four OFDM symbols for y=0, from interlaces x+3, x+6, x+9 and x in the four OFDM symbols for y=1, from interlaces x+6, x+9, x and x+3 in the four OFDM symbols for y=2, and from interlaces x+9, x, x+3 and x+6 in the four OFDM symbols for y=3. The extracted received symbols for each OFDM symbol are then despread with the corresponding bits of the PBRS sequence to obtain despread symbols. The despread symbols for OFDM symbols l+1, l+2 and l+3 are multiplied with $e^{-j2\pi \cdot x \cdot G}$, $e^{-j4\pi \cdot x \cdot G}$ and $e^{-j6\pi \cdot x \cdot G}$, respectively, to account for the phase rotation across OFDM symbols due to the frequency error of x bins. The results of the processing are estimated channel gains (or simply, channel gains) for the pilot subbands. The channel gains for hypothesis $H_{x,y}$ for pilot offsets of y=0, 1, 2 and 3 are given below:

$$H_{x,0} = \begin{cases} [w_0 \cdot Z_x(l), & w_{12} \cdot Z_{x+12}(l), & w_{24} \cdot Z_{x+24}(l), & \ldots, w_T \cdot Z_{x+T}(l)] \\ [w_3 \cdot Z_{x+3}(l+1), & w_{15} \cdot Z_{x+15}(l+1), & w_{27} \cdot Z_{x+27}(l+1), & \ldots, w_{T+3} \cdot Z_{x+T+3}(l+1)] \cdot e^{-j2\pi \cdot x \cdot G} \\ [w_6 \cdot Z_{x+6}(l+2), & w_{18} \cdot Z_{x+18}(l+2), & w_{30} \cdot Z_{x+30}(l+2), & \ldots, w_{T+6} \cdot Z_{x+T+6}(l+2)] \cdot e^{-j4\pi \cdot x \cdot G} \\ [w_9 \cdot Z_{x+9}(l+3), & w_{21} \cdot Z_{x+21}(l+3), & w_{33} \cdot Z_{x+33}(l+3), & \ldots, w_{T+9} \cdot Z_{x+T+9}(l+3)] \cdot e^{-j6\pi \cdot x \cdot G} \end{cases}, \quad \text{Eq (6)}$$

$$H_{x,1} = \begin{cases} [w_3 \cdot Z_{x+3}(l), & w_{15} \cdot Z_{x+15}(l), & w_{27} \cdot Z_{x+27}(l), & \ldots, w_{T+3} \cdot Z_{x+T+3}(l)] \\ [w_6 \cdot Z_{x+6}(l+1), & w_{18} \cdot Z_{x+18}(l+1), & w_{30} \cdot Z_{x+30}(l+1), & \ldots, w_{T+6} \cdot Z_{x+T+6}(l+1)] \cdot e^{-j2\pi \cdot x \cdot G} \\ [w_9 \cdot Z_{x+9}(l+2), & w_{21} \cdot Z_{x+21}(l+2), & w_{33} \cdot Z_{x+33}(l+2), & \ldots, w_{T+9} \cdot Z_{x+T+9}(l+2)] \cdot e^{-j4\pi \cdot x \cdot G} \\ [w_0 \cdot Z_x(l+3), & w_{12} \cdot Z_{x+12}(l+3), & w_{24} \cdot Z_{x+24}(l+3), & \ldots, w_T \cdot Z_{x+T}(l+3)] \cdot e^{-j6\pi \cdot x \cdot G} \end{cases},$$

$$H_{x,2} = \begin{cases} [w_6 \cdot Z_{x+6}(l), & w_{18} \cdot Z_{x+18}(l), & w_{30} \cdot Z_{x+30}(l), & \ldots, w_{T+6} \cdot Z_{x+T+6}(l)] \\ [w_9 \cdot Z_{x+9}(l+1), & w_{21} \cdot Z_{x+21}(l+1), & w_{33} \cdot Z_{x+33}(l+1), & \ldots, w_{T+9} \cdot Z_{x+T+9}(l+1)] \cdot e^{-j2\pi \cdot x \cdot G} \\ [w_0 \cdot Z_x(l+2), & w_{12} \cdot Z_{x+12}(l+2), & w_{24} \cdot Z_{x+24}(l+2), & \ldots, w_T \cdot Z_{x+T}(l+2)] \cdot e^{-j4\pi \cdot x \cdot G} \\ [w_3 \cdot Z_{x+3}(l+3), & w_{15} \cdot Z_{x+15}(l+3), & w_{27} \cdot Z_{x+27}(l+3), & \ldots, w_{T+3} \cdot Z_{x+T+3}(l+3)] \cdot e^{-j6\pi \cdot x \cdot G} \end{cases},$$

$$H_{x,3} = \begin{cases} [w_9 \cdot Z_{x+9}(l), & w_{21} \cdot Z_{x+21}(l), & w_{33} \cdot Z_{x+33}(l), & \ldots, w_{T+9} \cdot Z_{x+T+9}(l)] \\ [w_0 \cdot Z_x(l+1), & w_{12} \cdot Z_{x+12}(l+1), & w_{24} \cdot Z_{x+24}(l+1), & \ldots, w_T \cdot Z_{x+T}(l+1)] \cdot e^{-j2\pi \cdot x \cdot G} \\ [w_3 \cdot Z_{x+3}(l+2), & w_{15} \cdot Z_{x+15}(l+2), & w_{27} \cdot Z_{x+27}(l+2), & \ldots, w_{T+3} \cdot Z_{x+T+3}(l+2)] \cdot e^{-j4\pi \cdot x \cdot G} \\ [w_6 \cdot Z_{x+6}(l+3), & w_{18} \cdot Z_{x+18}(l+3), & w_{30} \cdot Z_{x+30}(l+3), & \ldots, w_{T+6} \cdot Z_{x+T+6}(l+3)] \cdot e^{-j6\pi \cdot x \cdot G} \end{cases},$$

where T=12·(S−1) is the index of the last subband in interlace 0.

Each hypothesis $H_{x,y}$ in equation (6) includes four rows of channel gains, one row for each OFDM symbol. Each row includes S channel gains for S pilot subbands in one OFDM symbol. The channel gains are derived from the received symbols that are extracted from different subbands depending on the frequency bin error x and the pilot offset y.

In an embodiment, a metric is derived for frequency/time hypothesis $H_{x,y}$ based on a channel impulse response estimate. For this embodiment, the channel gains from the four OFDM symbols for hypothesis $H_{x,y}$ are first sorted based on subband indices. As an example, for hypothesis $H_{x,0}$, the sorted channel gains may be given as:

$$\{H_{x,y}\} = \{H_0 = w_0 \cdot Z_x(l), \quad \text{Eq (7)}$$
$$H_1 = w_3 \cdot Z_{x+3}(l+1) \cdot e^{-j2\pi \cdot x \cdot G},$$
$$H_2 = w_6 \cdot Z_{x+6}(l+2) \cdot e^{-j4\pi \cdot x \cdot G},$$
$$H_3 = w_9 \cdot Z_{x+9}(l+3) \cdot e^{-j\pi \cdot x \cdot G},$$
$$H_4 = w_{12} \cdot Z_{x+12}(l),$$
$$\vdots$$
$$H_{4S-1} = w_{T+9} \cdot Z_{x+T+9}(l+3) \cdot e^{-j6\pi \cdot x \cdot G}\}.$$

An FFT/DFT may then be performed on the 4S sorted channel gains $\{H_{x,y}\}$ to obtain a time-domain channel impulse response estimate with 4S channel taps, which may be given as:

$$\{h_{x,y}\} = \{h_{x,y}(0), h_{x,y}(1), h_{x,y}(2), \ldots, h_{x,y}(4S-1)\}. \quad \text{Eq (8)}$$

Since 4S is not a power of 2, the channel gains $\{H_{x,y}\}$ may be zero-filled to a power two, and an FFT may then be performed on the zero-filled channel gains.

In general, channel gains may be obtained for any number of interlaces and any number of subbands in each interlace. The length of the channel impulse response estimate is dependent on the number of channel gains and may be shorter than 4S. As shown in Table 1, DVB-H has many more scattered pilot subbands than ISDB-T. To reduce computational complexity, a subset of the scattered pilot subbands may be used to derive the metric for each hypothesis. For example, the first 16, 32 and 64 pilot subbands in each OFDM symbol may be used for modes 1, 2 and 3, respectively, in DVB-H. The channel impulse response estimate for each hypothesis may then be derived using 64-, 128- and 256-point FFTs for modes 1, 2 and 3, respectively. The FFT size is four times the number of pilot subbands selected for use.

If hypothesis $H_{x,y}$ is a wrong hypothesis, then one or both of the following apply:

1. The extracted received symbols are received data symbols having random complex values. After the PRBS despreading, the despread symbols remain random complex values.
2. The extracted received symbols are received pilot symbols that are shifted from their correct frequency alignment by a multiple of 3 subbands. When these received pilot symbols are despread with the PRBS sequence, the resultant despread symbols are random scrambled values.

In either of the two cases above, the despread symbols are noisy and are not representative of the channel gains. The channel impulse response estimate derived from these noisy despread symbols would then contain mostly noise.

Conversely, if hypothesis $H_{x,y}$ is the correct hypothesis, then the extracted received symbols are the received pilot symbols properly aligned in both time and frequency. When these received pilot symbols are despread with the PRBS sequence, the resultant despread symbols are good estimates of the channel gains. A channel impulse response estimate may then be derived based on these channel gains. This channel impulse response estimate includes a signal component that is above the noise floor.

A metric may be defined based on the channel impulse response estimate in various manners. In an embodiment, a metric $M_{x,y}^a$ is set to the energy of the largest tap in the channel impulse response estimate, which may be expressed as:

$$M_{x,y}^a = \max_n |h_{x,y}(n)|^2. \quad \text{Eq (9)}$$

In another embodiment, a metric $M_{x,y}^b$ is set to the total energy of all taps in the channel impulse response estimate, which may be expressed as:

$$M_{x,y}^b \sum_{n=0}^{4S-1} |h_{x,y}(n)|^2. \quad \text{Eq (10)}$$

In yet another embodiment, the metric $M_{x,y}^c$ is set to the energy of large taps in the channel impulse response estimate, which may be expressed as:

$$M_{x,y}^c = \sum_{|h_{x,y}(n)|^2 > E_{th}} |h_{x,y}(n)|^2, \quad \text{Eq (11)}$$

where $E_{th}$ is a threshold used to determine whether a given tap is large. $E_{th}$ may be set to a fixed value or to a predetermined percentage (e.g., 10%) of the total energy of all taps.

In yet another embodiment, a metric $M_{x,y}^d$ is set to a non-coherent sum of metrics obtained for multiple (L) sets of OFDM symbols, as follows:

$$M_{x,y}^d = \sum_i M_{x,y}(i), \quad \text{Eq (12)}$$

where $M_{x,y}(i)$ is a metric obtained for OFDM symbol set i. $M_{x,y}(i)$ may be obtained based on equation (9), (10) or (11). The L OFDM symbol sets may be adjacent to one another or spread out over time.

In general, a metric $M_{x,y}$ may be derived for hypothesis $H_{x,y}$ based on equation (9), (10), (11), (12) or some other equation. For the embodiments described above, the FFT operation coherently sums the channel gains $\{H_{x,y}\}$ and provides the channel taps $\{h_{x,y}\}$. This coherent sum provides high processing gain and yields good detection performance even in low SNR conditions. In some other embodiments, metric $M_{x,y}$ may be derived based on the channel gains $\{H_{x,y}\}$ in other manners, e.g., by summing the energies of the channel gains.

In any case, a metric $M_{x,y}$ is obtained for each frequency/time hypothesis. The metrics for all frequency/time hypotheses may be compared, and the hypothesis with the largest metric may be provided as the correct hypothesis. The frequency bin error for the correct hypothesis may be provided to rotator 414, as shown in FIG. 4. The pilot offset for the correct hypothesis may be provided to channel estimator 422 and possibly other processing units within receiver 150.

Figure 5:
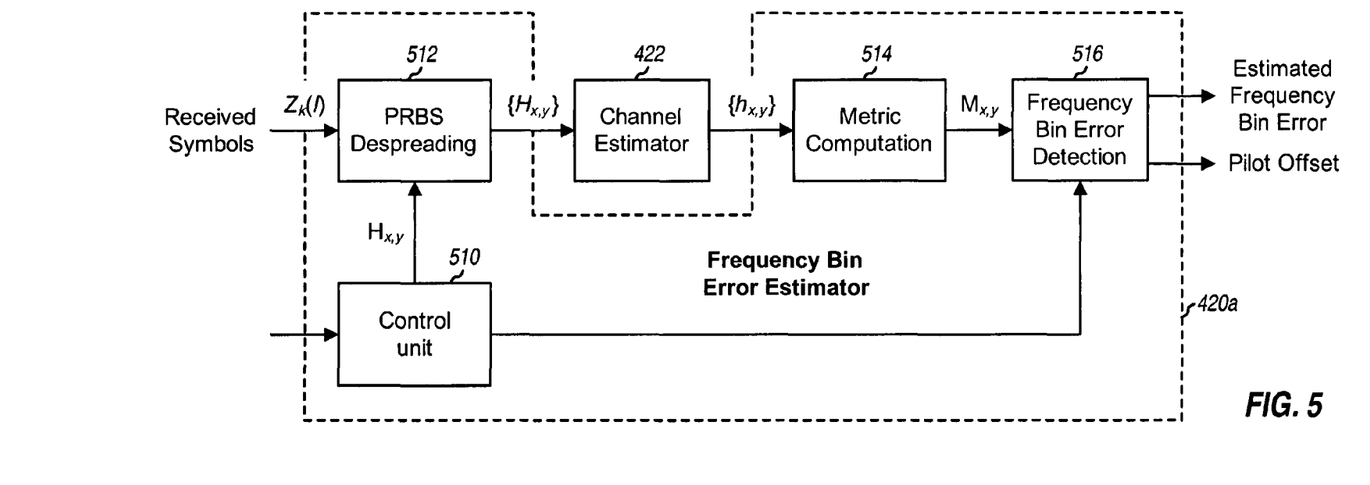
FIGS. 5 and 6 show two embodiments of a frequency bin error estimator.

FIG. 5 shows a block diagram of a frequency bin error estimator 420a, which is an embodiment of estimator 420 within OFDM demodulator 160 in FIG. 4. Within estimator 420a, a control unit 510 receives inputs indicative of the range of frequency errors (e.g., ±4 bins) and whether the pilot offset is known. Control unit 510 forms hypotheses covering all frequency and/or time uncertainty. A despreading unit 512 obtains received symbols for the K total subbands, extracts the received symbols from the proper subbands for the hypothesis $H_{x,y}$ being evaluated, performs despreading of the extracted received symbols with the PBRS sequence, rotates the despread symbols for each OFDM symbol by $e^{-j2\pi \cdot v \cdot x \cdot G}$ to obtain the channel gains $\{H_{x,y}\}$, where v is 0, 1, 2 and 3 for the four OFDM symbols in a set being evaluated.

Channel estimator 422 receives the channel gains for each hypothesis $H_{x,y}$ and derives a channel impulse response estimate $\{h_{x,y}\}$ for that hypothesis. A metric computation unit 514 derives a metric $M_{x,y}$ for each hypothesis based on the channel impulse response estimate, e.g., using any of the embodiments described above. Unit 514 may non-coherently sum multiple metrics obtained for different OFDM symbol sets as shown in equation (12) or may omit this non-coherent sum, e.g., for a fast fading channel. A detection unit 516 receives the metrics for all hypotheses, identifies the largest metric, and provides the hypothesis with the largest metric as the correct hypothesis.

For frequency bin error estimation scheme 4 in Table 2, the frequency bin error may be determined based on the continual pilot that is sent on the same interlace in all OFDM symbol periods so that there is no ambiguity as to the pilot subbands. Once the frequency bin error has been determined, the pilot offset may be ascertained based on the scattered pilot. By decoupling the frequency bin error and the pilot offset, the frequency bin error may be determined with 13 frequency hypotheses for a frequency error range of ±6 bins, and the pilot offset may be determined with 4 time hypotheses.

A frequency hypothesis $H_x$ corresponds to a hypothesized frequency error of x bins. The number of frequency hypotheses to evaluate is dependent on the frequency error range. Each frequency hypothesis may be evaluated as follows.

If hypothesis $H_x$ is correct, then continual pilot symbols are received on subbands k+x, for k ∈ CP, where CP denotes the set of continual pilot subbands to be considered. CP may contain all or a subset of the continual pilot subbands. Equations (4) and (5) may then be expressed as:

$$Z_{k+x}(l) = H_k(l) \cdot \frac{4}{3} w_k + N_{k+x}(l), \text{ and} \quad \text{Eq (13)}$$

$$Z_{k+x}(l+1) = e^{j2\pi \cdot x \cdot G} \cdot H_k(l+1) \cdot \frac{4}{3} w_k + N_{k+x}(l+1), \quad \text{Eq (14)}$$

where $$S_k(l+1) = S_k(l) = \frac{4}{3} \cdot w_k$$

are pilot symbols sent on subband k. Since the same PBRS sequence is used for all OFDM symbols, the pilot symbols are not a function of OFDM symbol index l.

If the wireless channel is relatively static over two consecutive OFDM symbol periods, then $H_k(l+1) \approx H_k(l)$ for all subbands. In this case, the correlation between two received symbols in two OFDM symbols l and l+1 for each pilot subband may be expressed as:

$$Z_{k+x}(l) \cdot Z_{k+x}^*(l+1) \approx \frac{16}{9} \cdot e^{-j2\pi \cdot x \cdot G} \cdot |H_k|^2. \quad \text{Eq (15)}$$

The correlation results may be accumulated across all pilot subbands, as follows:

$$\sum_{k \in CP} Z_{k+x}(l) \cdot Z_{k+x}^*(l+1) \approx \frac{16}{9} \cdot e^{-j2\pi \cdot x \cdot G} \cdot \sum_{k \in CP} |H_k|^2. \quad \text{Eq (16)}$$

The correlation results may further be accumulated across multiple correlation intervals, as follows:

$$\sum_{l} \sum_{k \in CP} Z_{k+x}(l) \cdot Z_{k+x}^*(l+1) \approx \frac{16}{9} \cdot e^{-j2\pi \cdot x \cdot G} \cdot \sum_{l} \sum_{k \in CP} |H_k|^2. \quad \text{Eq (17)}$$

Each correlation interval corresponds to a different pair of OFDM symbols. For example, a first accumulated result may be obtained for OFDM symbols l and l+1 as shown in equation (16), a second accumulated result may be obtained for OFDM symbols l+1 and l+2, a third accumulated result may be obtained for OFDM symbols l+2 and l+3, and a fourth accumulated result may be obtained for OFDM symbols l+3 and l+4. The four accumulated results may then be summed to obtain the overall result shown in equation (17). In general, the correlation results may be accumulated across any number of subbands and any number of OFDM symbols.

If hypothesis $H_x$ is not correct because the hypothesized frequency bin error x is not equal to the actual frequency bin error m, or x≠m, then received data symbols are extracted from subbands k+x, for k ∈ CP. Equations (4) and (5) may then be expressed as:

$$Z_{k+x}(l) = H_{k+x-m}(l) \cdot D_{k+x-m}(l) + N_{k+x}(l), \text{ and} \quad \text{Eq (18)}$$

$$Z_{k+x}(l+1) = e^{j2\pi \cdot x \cdot G} \cdot H_{k+x-m}(l+1) \cdot D_{k+x-m}(l+1) + N_{k+x}(l+1), \quad \text{Eq (19)}$$

where $D_{k+x-m}(l)$ and $D_{k+x-m}(l+1)$ are data symbols sent on subband k+x−m in OFDM symbols l and l+1, respectively. The extracted received symbols may be correlated and accumulated across pilot subbands, as follows:

$$\sum_{k \in CP} Z_{k+x}(l) \cdot Z_{k+x}^*(l+1) \approx \quad \text{Eq (20)}$$

$$\frac{16}{9} \cdot e^{-j2\pi \cdot m \cdot G} \cdot \sum_{k \in CP} |H_{k+x-m}|^2 \cdot D_{k+x-m}(l) \cdot D_{k+x-m}^*(l+1).$$

Equation (20) indicates that the magnitude squares of the channel gains do not sum up coherently due to the random nature of the data symbols $D_{k+x-m}(l)$ and $D_{k+x-m}(l+1)$. If the data symbols are independently and identically distributed (i.i.d.) with zero mean, which is typically the case, then the accumulated result may be given as:

$$\sum_{l} \sum_{k \in CP} Z_{k+x}(l) \cdot Z_{k+x}^*(l+1) \to 0. \quad \text{Eq (21)}$$

Equation (21) indicates that the accumulated result approaches zero if the accumulation is performed over a sufficient number of OFDM symbols.

A metric $Q_x^a$ may be defined for hypothesis $H_x$ as follows:

$$Q_x^a = \text{Re}\left\{ e^{j2\pi \cdot x \cdot G} \cdot \sum_l \sum_{k \in CP} Z_{k+x}(l) \cdot Z_{k+x}^*(l+1) \right\}. \quad \text{Eq (22)}$$

In equation (22), the correlation results $Z_{k+x}(l) \cdot Z_{k+x}^*(l+1)$ are coherently summed over both frequency and time, the accumulated result is rotated by $e^{j2\pi \cdot x \cdot G}$, and the real part of the rotated result is provided as metric $Q_x^a$. If hypothesis $H_x$ is correct, then the rotated result would have a large positive real part, and metric $Q_x^a$ is a large value. Conversely, if hypothesis $H_x$ is incorrect, then the rotated result is a small value, and metric $Q_x^a$ is likewise a small value.

The description above assumes that the wireless channel is relatively static over the correlation interval. This assumption may not be true for a fast fading channel, and the correlation between the received symbols may then be expressed as:

$$Z_{k+x}(l) \cdot Z_{k+x}^*(l+1) \approx \frac{16}{9} \cdot e^{-j2\pi \cdot x \cdot G} \cdot |H_k(l)| \cdot |H_k(l+1)| \cdot e^{-j\theta_k(l)}, \quad \text{Eq (23)}$$

where $\theta_k(l)$ is a random variable for the phase difference in the wireless channel observed by subband k between OFDM symbol periods l and l+1. A computer simulation was performed for different channel realizations and for a number of OFDM symbol periods. For each OFDM symbol period, the phase difference was determined for each pilot subband, and the phase differences for all pilot subbands were plotted as a histogram. This histogram typically has a single nodal peak.

If $\theta_k(l)$ is centered near 90°, 180° or 270°, then the following metric $Q_x^s$ provides good performance:

$$Q_x^s = \left| \sum_l \sum_{k \in CP} Z_{k+x}(l) \cdot Z_{k+x}^*(l+1) \right|^2. \quad \text{Eq (24)}$$

In equation (24), the correlation results are coherently summed over both frequency and time, and the squared magnitude of the accumulated result is provided as metric $Q_x^s$.

In a fast fading channel, the single nodal peak may shift rapidly from one correlation interval to the next. For example, the peak may be centered near 0° in one correlation interval and may shift to 180° in the next correlation interval. $\eta_k(l)$ may thus be nearly out of phase in consecutive correlation intervals. In this case, a metric $Q_x^f$ may be defined as:

$$Q_x^f = \sum_l \left| \sum_{k \in CP} Z_{k+x}(l) \cdot Z_{k+x}^*(l+1) \right|^2. \quad \text{Eq (25)}$$

In equation (25), the correlation results are (1) coherently summed over frequency to take advantage of the single nodal distribution of $\eta_k(l)$ for the pilot subbands and (2) non-coherently summed over time to account for fast and random changes in $\theta_k(l)$. Metric $Q_x^f$ may provide better performance for a fast fading channel.

In general, metric $Q_x^s$ is better for static and slow fading channels, and metric $Q_x^f$ is better for a fast fading channel. A metric $Q_x^c$ may be defined based on both $Q_x^s$ and $Q_x^f$, as follows:

$$Q_x^c = \alpha \cdot Q_x^s + (1-\alpha) \cdot Q_x^f, \quad \text{Eq (26)}$$

where $\alpha$ is a weighting factor that determines the weights to be given to $Q_x^s$ and $Q_x^f$. $Q_x^c$ is equal to $Q_x^s$ for $\alpha=1$, is equal to $Q_x^f$ for $\alpha=0$, and is equal to a weighted sum of $Q_x^s$ and $Q_x^f$ for $0<\alpha<1$. Computer simulation shows that $\alpha=0.2$ provides good performance for both slow and fast fading channels. $\alpha$ may also be a configurable value.

In general, a metric $Q_x$ may be derived for hypothesis $H_x$ based on equation (22), (24), (25), (26) or some other equation. Metric $Q_x$ may be computed for each frequency hypothesis, and the metrics for all hypotheses may be compared. The hypothesis with the largest metric may be provided as the correct hypothesis, as follows:

$$\hat{m} = \underset{x}{\text{argmax}}\{Q_x\}. \quad \text{Eq (27)}$$

The pilot offset may be determined based on the scattered pilot once the frequency bin error has been determined based on the continual pilot. A time hypothesis $H_y$ corresponds to a hypothesized pilot offset of y, which means that the scattered pilot is being sent on interlace 3y in OFDM symbol period 1. Four time hypotheses are formed for y=0, 1, 2 and 3, and each hypothesis may be evaluated as follows. For hypothesis $H_y$, the scattered pilot is hypothesized to have been sent on subbands $\hat{m}+3y+12j$, for j=0, 1, 2 ..., in OFDM symbol periods l and l+4. The correlation between two received symbols in OFDM symbol periods l and l+4 for each pilot symbol may then be expressed as:

$$Z_{\hat{m}+3y+12j}(l) \cdot Z_{\hat{m}+3y+12j}^*(l+4). \quad \text{Eq (28)}$$

A metric $Q_y$ may be derived for hypothesis $H_y$ by substituting $Z_{\hat{m}+3y+12j}(l) \cdot Z_{\hat{m}+3y+12j}^*(l+4)$ for $Z_{k+x}(l) \cdot Z_{k+x}^*(l+1)$ in the equations described above. Four metrics are obtained for four time hypotheses. The time hypothesis with the largest metric may be provided as the correct hypothesis.

Figure 6:
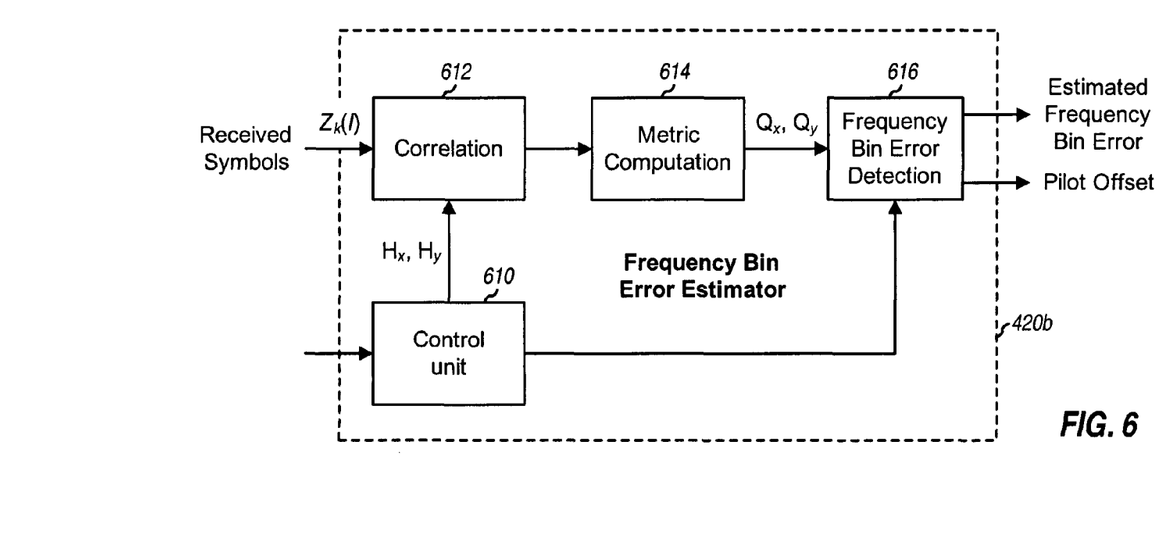

FIG. 6 shows a block diagram of a frequency bin error estimator 420b, which is another embodiment of estimator 420 within OFDM demodulator 160 in FIG. 4. Within estimator 420b, a control unit 610 receives inputs indicative of the range of frequency errors (e.g., ±4 bins) and whether the pilot offset is known. Control unit 610 forms a set of frequency hypotheses covering all frequency uncertainty and a set of time hypotheses covering all time uncertainty. A correlation unit 612 obtains received symbols for the K total subbands, extracts the received symbols from the proper subbands for hypothesis $H_x$ or $H_y$ being evaluated, performs correlation on the extracted received symbols, and provides correlation results for different subbands and correlation intervals.

A metric computation unit 614 derives a metric $Q_x$ or $Q_y$ for each hypothesis based on the correlation results for that hypothesis, e.g., using any of the embodiments described above. Unit 614 may coherently sum the correlation results across subbands and may coherently or non-coherently sum across correlation intervals. A detection unit 616 receives the metrics for all frequency hypotheses, identifies the largest metric, and provides the frequency bin error for the frequency hypothesis with the largest metric as the estimated frequency bin error. Detection unit 616 also receives the metrics for all time hypotheses, identifies the largest metric, and provides the pilot offset for the time hypothesis with the largest metric as the correct pilot offset.

For scheme 2 in Table 2, hypotheses are formed jointly for frequency bin error and pilot offset, and each hypothesis is evaluated using correlation-based metrics, e.g., the metrics shown in equations (22), (24), (25) and/or (26). For scheme 3 in Table 2, hypotheses are formed separately for frequency bin error and pilot offset, and each hypothesis is evaluated using despreading-based metrics, e.g., the metrics shown in equations (9), (10), (11) and/or (12). A scheme may also use a combination of despreading-based metric and correlation-based metric. For example, a despreading-based metric may be used for frequency hypotheses, and a correlation-based metric may be used for time hypotheses. Other metrics defined in other manners may also be used to evaluate the hypotheses.

Figure 7:
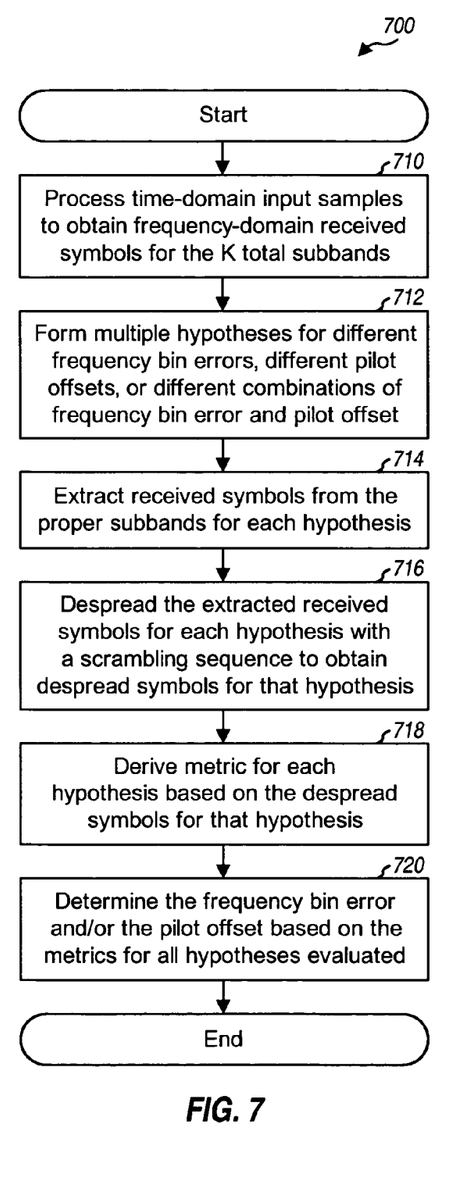
FIG. 7 shows a process for performing frequency error estimation by despreading the received symbols.

FIG. 7 shows an embodiment of a process 700 for performing frequency error estimation by despreading the received symbols. Time-domain input samples are processed to obtain frequency-domain received symbols for the K total subbands (block 710). Multiple hypotheses are formed for different frequency bin errors (or bin offsets), different pilot offsets, or different combinations of frequency bin error and pilot offset (block 712). For each hypothesis, received symbols are extracted from the proper subbands determined by the hypothesis (block 714). The extracted received symbols are hypothesized to be for (1) a scattered pilot that is sent on different sets of subbands in different symbol periods and/or (2) a continual pilot that is sent on the same set of subbands in all symbol periods. The extracted received symbols for each hypothesis are despread with a scrambling sequence, e.g., the PBRS sequence, to obtain despread symbols for that hypothesis (block 716). A metric is then derived for each hypothesis based on the despread symbols for that hypothesis (block 718). For block 718, a channel impulse response estimate may be derived for each hypothesis based on the despread symbols for the hypothesis. The metric for each hypothesis may then be derived based on the channel impulse response estimate for the hypothesis, as described above. In any case, the frequency bin error and/or the pilot offset are determined based on the metrics for all hypotheses evaluated (block 720).

Figure 8:
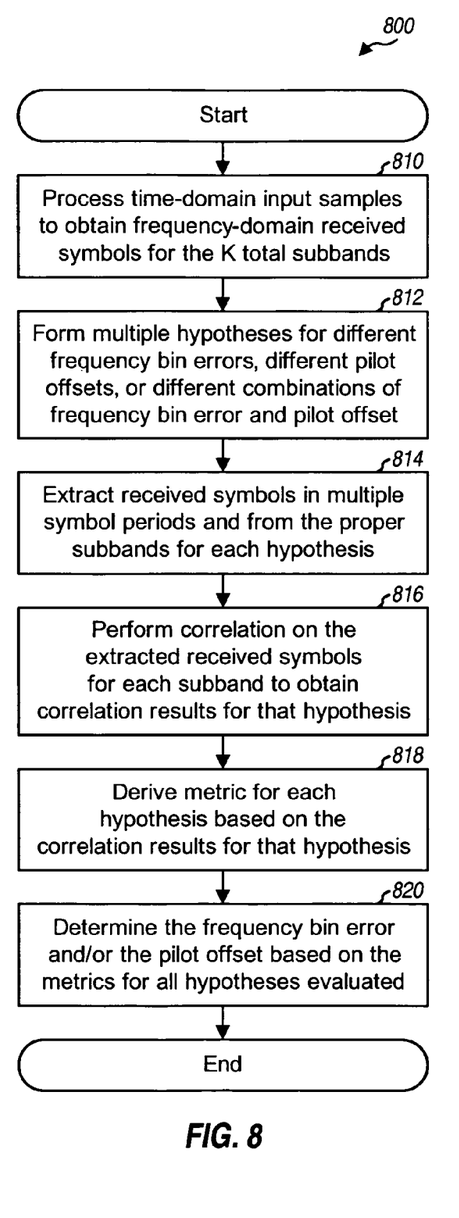
FIG. 8 shows a process for performing frequency error estimation by correlating the received symbols.

FIG. 8 shows an embodiment of a process 800 for performing frequency error estimation by correlating the received symbols. Time-domain input samples are processed to obtain frequency-domain received symbols for the K total subbands (block 810). Multiple hypotheses are formed for different frequency bin errors, different pilot offsets, or different combinations of frequency bin error and pilot offset (block 812). For each hypothesis, received symbols in multiple symbol periods are extracted from the proper subbands determined by the hypothesis (block 814). The extracted received symbols are hypothesized to be for a scattered pilot and/or a continual pilot. For each hypothesis, correlation is performed on the extracted received symbols for each subband to obtain correlation results for that hypothesis (block 816). A metric is then derived for each hypothesis based on the correlation results for all subbands and correlation intervals for that hypothesis (block 818). For example, the metric for each hypothesis may be derived by coherently summing the correlation results across subbands and coherently or non-coherently summing the correlation results across correlation intervals. The metric may also be derived based on a weighted sum of metrics obtained with different accumulation schemes, e.g., as shown in equation (26). In any case, the frequency bin error and/or the pilot phase is determined based on the metrics for all hypotheses evaluated (block 820).

Figure 9:
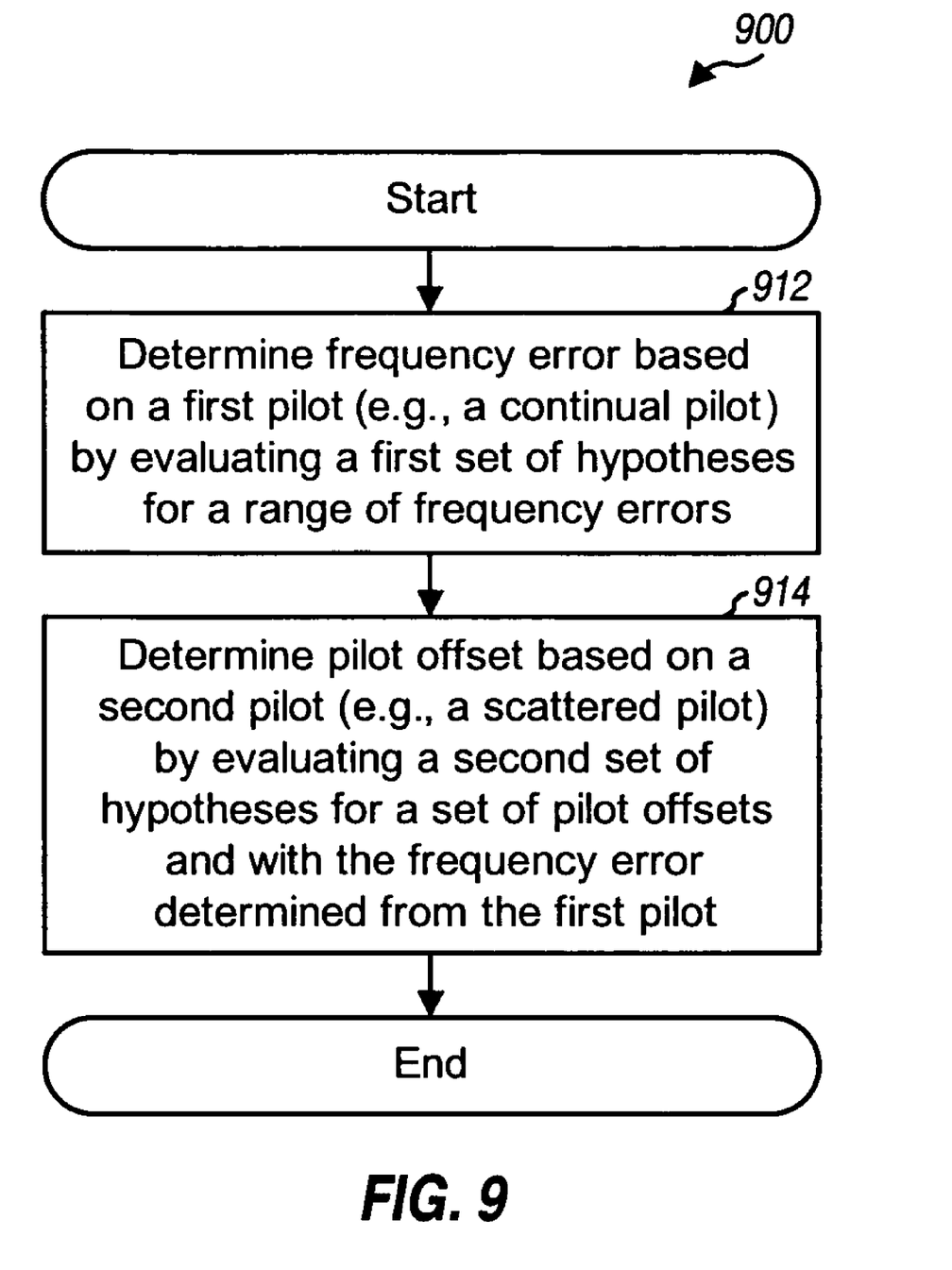
FIG. 9 shows a process for performing frequency error estimation in stages.

FIG. 9 shows an embodiment of a process 900 for performing frequency error estimation in multiple stages. A frequency error is determined based on a first pilot (e.g., a continual pilot) by evaluating a first set of hypotheses for a range of frequency errors (block 912). A pilot offset is determined based on a second pilot (e.g., a scattered pilot) by evaluating a second set of hypotheses for a set of pilot offsets and with the frequency error determined from the first pilot (block 914). The two sets of hypotheses may be evaluated using the same or different metrics.

Process 700, 800, and/or 900 may be performed by frequency bin error estimator 420 in FIG. 4, controller/processor 180 in FIG. 1, and/or some other processing unit at receiver 150.

The techniques described herein may be implemented by various means. For example, these techniques may be implemented in hardware, firmware, software, or a combination thereof. For a hardware implementation, the processing units used to perform frequency error estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 182 in FIG. 1) and executed by a processor (e.g., processor 180). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a wireless receiver, wherein the wireless receiver comprises:
at least one processor configured to perform correlation on received symbols for multiple subbands and multiple symbol periods for each of a plurality of hypotheses, each hypothesis representing one of a plurality of frequency error estimates, to derive a metric for each of the plurality of hypotheses based on correlation results for each of the plurality of hypotheses, and to determine a frequency error based on metrics derived for each of the plurality of hypotheses; and
a memory coupled to the at least one processor;
wherein for each hypothesis the at least one processor is configured to coherently sum correlation results for the multiple subbands in each correlation interval to obtain an intermediate value for the correlation interval, to coherently sum intermediate values for the multiple correlation intervals to obtain a first value, to non-coherently sum the intermediate values for the multiple correlation intervals to obtain a second value, and to derive the metric for the hypothesis based on a sum of the first and second values.

2. The apparatus of claim 1, wherein the at least one processor is configured to form the plurality of hypotheses for a range of frequency errors, wherein each hypothesis corresponds to a different hypothesized frequency error.

3. The apparatus of claim 1, wherein the at least one processor is configured to form the plurality of hypotheses for a plurality of pilot offsets, wherein each hypothesis corresponds to a different set of subbands used for pilot in a given symbol period.

4. The apparatus of claim 1, wherein for each hypothesis the at least one processor is configured to extract received symbols in the multiple symbol periods for the multiple subbands determined by the hypothesis, and to perform correlation on the extracted received symbols for each of the multiple subbands.

5. The apparatus of claim 4, wherein the extracted received symbols are hypothesized to be for a scattered pilot sent on different sets of subbands in different symbol periods.

6. The apparatus of claim 4, wherein the extracted received symbols are hypothesized to be for a continual pilot sent on a predetermined set of subbands.

7. The apparatus of claim 1, wherein each correlation interval covers a different pair of symbol periods.

8. The apparatus of claim 1, wherein the at least one processor is configured to coherently sum correlation results for multiple correlation intervals for each hypothesis, wherein each correlation interval covers a different pair of symbol periods.

9. The apparatus of claim 1, wherein the at least one processor is configured to non-coherently sum correlation results for multiple correlation intervals for each hypothesis, wherein each correlation interval covers a different pair of symbol periods.

10. The apparatus of claim 1, wherein the sum of the first and second values comprises a weighted sum of the first value and the second value.

11. A method comprising:
at a wireless receiver comprising a processor, performing correlation on received symbols for multiple subbands and multiple symbol periods for each of a plurality of hypotheses, each hypothesis representing one of a plurality of frequency error estimates;
deriving a metric for each hypothesis based on correlation results for each of the plurality of hypotheses; and
determining a frequency error based on metrics derived for each of the plurality of hypotheses;
wherein deriving the metric for each hypothesis comprises:
coherently summing correlation results for the multiple subbands in each correlation interval to obtain an intermediate value for the correlation interval;
coherently summing intermediate values for the multiple correlation intervals to obtain a first value;
non-coherently summing the intermediate values for the multiple correlation intervals to obtain a second value; and
deriving the metric for the hypothesis based on a sum of the first and second values.

12. The method of claim 11, wherein each correlation interval covers a different pair of symbol periods.

13. The method of claim 11, wherein the deriving the metric for each hypothesis comprises coherently or non-coherently summing correlation results for multiple correlation intervals, wherein each correlation interval covers a different pair of symbol periods.

14. The method of claim 11, wherein the sum of the first and second values comprises a weighted sum of the first value and the second value.

15. An apparatus comprising:
a wireless receiver means, wherein the wireless receiver means comprises:
means for performing correlation on received symbols for multiple subbands and multiple symbol periods for each of a plurality of hypotheses, each hypothesis representing one of a plurality of frequency error estimates;
means for deriving a metric for each of the plurality of hypotheses based on correlation results for each of the plurality of hypotheses; and
means for determining a frequency error based on metrics derived for each of the plurality of hypotheses;
wherein the means for deriving the metric for each hypothesis comprises:
means for coherently summing correlation results for the multiple subbands in each correlation interval to obtain an intermediate value for the correlation interval;
means for coherently summing intermediate values for the multiple correlation intervals to obtain a first value;
means for non-coherently summing the intermediate values for the multiple correlation intervals to obtain a second value; and
means for deriving the metric for the hypothesis based on a weighted sum of the first and second values.

16. The apparatus of claim 15, wherein the means for deriving the metric for each hypothesis comprises means for coherently summing correlation results for the multiple subbands.

17. The apparatus of claim 15, wherein the means for deriving the metric for each hypothesis comprises means for coherently or non-coherently summing correlation results for multiple correlation intervals, wherein each correlation interval covers a different pair of symbol periods.

18. The apparatus of claim 15, wherein each correlation interval covers a different pair of symbol periods.

19. The apparatus of claim 15, wherein the sum of the first and second values comprises a weighted sum of the first value and the second value.

20. A non-transitory computer readable medium containing software that, when executed, causes the computer to perform the acts of:
performing correlation on received symbols for multiple subbands and multiple symbol periods for each of a plurality of hypotheses, each hypothesis representing one of a plurality of frequency error estimates;
deriving a metric for each of the plurality of hypotheses based on correlation results for different subbands and correlation intervals for each of the plurality of hypotheses; and
determining a frequency error based on metrics derived for each of the plurality of hypotheses;
wherein deriving the metric for each hypothesis comprises:
coherently summing correlation results for the multiple subbands in each correlation interval to obtain an intermediate value for the correlation interval;
coherently summing intermediate values for the multiple correlation intervals to obtain a first value;

non-coherently summing the intermediate values for the multiple correlation intervals to obtain a second value; and deriving the metric for the hypothesis based on a sum of the first and second values.

21. The non-transitory computer readable medium of claim 20, wherein the sum of the first and second values comprises a weighted sum of the first value and the second value.

* * * * *